United States Patent
Trahan et al.

(10) Patent No.: US 6,953,537 B2
(45) Date of Patent: Oct. 11, 2005

(54) CORROSION INHIBITOR

(76) Inventors: Scott David Trahan, P.O. Box 1732, Prairieville, LA (US) 70769; Eric Paul Mistretta, P.O. Box 1732, Prairieville, LA (US) 70769

( * ) Notice: Subject to any disclaimer, the term of this patent is extended or adjusted under 35 U.S.C. 154(b) by 45 days.

(21) Appl. No.: 10/349,719

(22) Filed: Jan. 23, 2003

(65) Prior Publication Data

US 2003/0230742 A1 Dec. 18, 2003

Related U.S. Application Data

(60) Provisional application No. 60/383,056, filed on May 24, 2002.

(51) Int. Cl.⁷ .......................... C23F 11/00; C23F 11/06; C23F 11/10; C05C 9/00; C05B 15/00
(52) U.S. Cl. ........................ 252/389.22; 252/389.23; 252/389.54; 71/28; 71/29; 71/30; 71/34; 71/DIG. 4; 423/269
(58) Field of Search .................. 252/389.21, 39.22, 252/389.23, 389.54, 400.21, 400.22, 400.23, 400.54; 71/28, 29, 30, 31, 32, 33, 34, DIG. 4; 423/269

(56) References Cited

U.S. PATENT DOCUMENTS

| | | | |
|---|---|---|---|
| 2,549,430 A | * | 4/1951 | Crittenden ...................... 71/30 |
| 3,024,100 A | * | 3/1962 | Langguth et al. ............... 71/34 |
| 3,029,139 A | * | 4/1962 | Arots et al. ..................... 71/30 |
| 3,185,648 A | * | 5/1965 | Standish et al. ............... 252/70 |
| 3,297,577 A | * | 1/1967 | Standish et al. ............... 252/70 |
| 4,219,348 A | * | 8/1980 | Parham et al. .................. 71/30 |
| 5,376,159 A | * | 12/1994 | Cunningham et al. ......... 71/30 |
| 5,704,961 A | * | 1/1998 | Hudson .......................... 71/30 |
| 5,731,032 A | * | 3/1998 | Orr ............................. 427/230 |
| 6,277,302 B1 | * | 8/2001 | Fan et al. .............. 252/389.52 |

* cited by examiner

Primary Examiner—Joseph D. Anthony
(74) Attorney, Agent, or Firm—Phelp Dunbar, LLP

(57) ABSTRACT

A corrosion inhibitor for use with Urea Ammonium Nitrate solutions is disclosed, comprising a blend of molybdate and one or more of the inorganic phosphates (including phosphates, polyphosphates, and pyrophosphates) and organic phosphates or phosphonates. Inorganic phosphates include, but are not limited to, SHMP (Sodium Hexametaphosphate) and TKPP (Tetra-Potassium Pyrophosphate). There are numerous other inorganic phosphates that will also serve as suitable secondary inhibitors. Organic phosphates or phosphonates include, but are not limited to, HEDP (1-Hydroxyethylidine-1,1-diphosphonic acid; also known as ethanol diphosphonate, acetodiphosphonic acid, or etidronic acid), ATMP or AMP (aminotri (methylenephosphonic acid)), PBTC (Phosphonobutane tricarboxylic acid), DETPMP (Diethylenetriaminepenta (methylene phosphonic acid)), and HPA (hydroxyphosphono acetic acid). There are numerous other organic phosphates and phosphonates that will also serve as suitable secondary inhibitors. The amount of molybdate can range from 1 ppm to 500 ppm by weight of fertilizer solution, with the preferred range from 10 ppm to 200 ppm. Amounts of inorganic or organic phosphate can also range from levels as low as 1 ppm up to 500 ppm, with the preferred range being from 5 ppm to 50 ppm.

10 Claims, No Drawings

CORROSION INHIBITOR

This application claims benefit of application Ser. No. 60/383,056 filed May 24, 2002.

FIELD OF THE INVENTION

This invention relates to corrosion inhibitors to be used with Urea Ammonium Nitrate solutions, commonly used as agricultural fertilizer. Such solutions can be very corrosive to metals, particularly ferrous metals.

BACKGROUND OF THE INVENTION

Aqueous solutions of Urea Ammonium Nitrate ("UAN") are commonly used as agricultural fertilizer. However, these solutions, typically 50%–80% UAN by weight (20% to 50% water), are very corrosive to metals, particularly ferrous containing metals. Manufacturers of UAN solutions have tried a number of methods to resolve the corrosion problem.

The production of UAN solutions can be by batch or continuous process. Urea and Ammonium Nitrate solutions are blended with water and pH adjusted, sometimes using ammonia. During production or post-production, efforts are made to defeat or limit the corrosive effects of the UAN solution. Some manufacturers use filmers, that act to coat the metal coming into contact with the UAN solution. Filmers are quickly depleted, however, as the UAN solution comes into contact with additional metal surfaces. Filmers can also result in more active corrosion at localized or focused sites, where the filmer fails to fully coat a metal surface. Filmers also are known to cause problems with foaming and sludge formation, additional undesirable side effects of the use of filmers.

Manufacturers have used various additives as corrosion inhibitors. For example, see U.S. Pat. No. 5,376,159 where molybdate, by itself, is used as a corrosion inhibitor. A variety of other materials have been used as corrosion inhibitors. For example in U.S. Pat. No. 3,024,100, a variety of flourosilicates in combination with molybdate is disclosed as a corrosion inhibitor for UAN.

SUMMARY OF THE INVENTION

It has been found that low levels of molybdate in combination with low levels of various phosphorous containing compounds controls corrosion in ferrous metals caused by contact with UAN solutions. In addition, foaming, sludge formation, and/or focused or localized corrosion has not been observed in connection with the use of the molybdate with certain phosphorous containing compounds. Additionally, the use of molybdate in combination with phosphorous containing compounds prevents or reduces the formation of precipitates, including iron and other potential precipitates. It is believed that the phosphorous containing compounds used in the instant invention act to tie up or sequester iron and others materials in a manner which maintains the potential precipitate in solution. Precipitates can cause localized corrosion, by creating a site which the inhibitor cannot reach, sometimes referred to as under-deposit corrosion. The avoidance of precipitates by the use of phosphorous containing compounds prevents the occurrence of under-deposit corrosion.

Typically an aqueous solution of alkali metal molybdate would be utilized, such as Sodium or Potassium molybdate ($Na_2MoO_4$ or $K_2MoO_4$). However, any other form of molybdate that can deliver a molybdate ion can be used. The other additive or additives, referred to herein as secondary inhibitors, would be one or more of the inorganic phosphates (including phosphates, polyphosphates, and pyrophosphates) and organic phosphates or phosphonates. Inorganic phosphates include, but are not limited to, SHMP (Sodium Hexametaphosphate) and TKPP (Tetra-Potassium Pyrophosphate). There are numerous other inorganic phosphates that will also serve as suitable secondary inhibitors. Organic phosphates or phosphonates include, but are not limited to, HEDP (1-Hydroxyethylidine-1,1-diphosphonic acid; also known as ethanol diphosphonate, acetodiphosphonic acid, or etidronic acid), ATMP or AMP (aminotri (methylenephosphonic acid)), PBTC (Phosphonobutane tricarboxylic acid), DETPMP (Diethylenetriaminepenta (methylene phosphonic acid)), and HPA (hydroxyphosphono acetic acid). There are numerous other organic phosphates and phosphonates that will also serve as suitable secondary inhibitors.

The combination of low levels of molybdate with low levels of one or more of these phosphorous containing compounds has resulted in lower corrosion rates than either inhibitor used alone, even at comparable dosage rates, and has resulted in cleaner UAN solutions with little iron or other material precipitates than with either inhibitor used alone.

The dosage of molybdate and phosphorous containing compounds can vary within a wide range, limited on the low side by the amount needed to insure adequate corrosion inhibition (taking into account that UAN solution may be further diluted by the consumer prior to use), and on the high side by the cost of the inhibitor and by the solubility of the inhibitors in the UAN solution. Amounts of molybdate can range from 1 ppm to 500 ppm by weight of UAN solution, with the preferred range from 10 ppm to 200 ppm. Amounts of phosphorous containing compounds can also range from levels as low as 1 ppm up to 500 ppm, with the preferred range being from 5 ppm to 50 ppm.

The corrosion inhibitor combination may be added to the UAN solution in a variety of ways. The inhibitors typically would be combined, and then may be added to the UAN solution during production of the UAN. However, the inhibitors also may be added to the UAN independently. Alternatively, the inhibitors are often added to the UAN solution after it is produced. Vessels used for storage or transportation of UAN solutions are often manufactured from ferrous materials and are subject to the corrosive effects of UAN. These vessels may include storage tanks, tanker trucks, barges, railroad cars, and similar vessels. Over time, the UAN-caused corrosion can threaten the integrity of the vessel. In addition, the quality of the UAN solution can be compromised by the products of the corrosion process, including the precipitation of iron containing compounds.

DETAILED DESCRIPTION OF THE INVENTION

The invention disclosed concerns the prevention or limitation of corrosion of metals, particularly ferrous metals, when subjected to contact with aqueous solution of UAN. Such solutions are frequently used as agricultural fertilizers, and can be of varying strengths. They are often produced as 50 to 80 weight % UAN solution. The strength of UAN solutions is sometimes expressed as weight percent of elemental nitrogen. A 65% UAN solution by weight UAN is comparable to a 32% elemental nitrogen weight percent solution. Lower strength solutions can be prepared, and may often be prepared by the agricultural user, by diluting industrially produced UAN solutions. UAN solutions higher than 80 weight % UAN may experience precipitation problems. Additionally, corrosion risks generally increase with the stronger UAN solutions.

Corrosion risks are associated with the both the production, storage, transportation, and use of UAN. Production piping, tanks, and other equipment, usually comprised of ferrous metals, are subjected to long term exposures and corrosive forces during the production of UAN. Agricultural users of UAN solutions often have ferrous equipment and tanks that are subject to the same corrosive forces. Transporters of UAN solutions often use ferrous equipment, such as storage tanks, tanker trucks, rail cars, and/or barges to store and transport UAN solutions. Both producers, transporters, and users of UAN solutions benefit from corrosion inhibitors added to the UAN solution during production or post production.

The present invention comprises a combination of two or more corrosion inhibiting compounds blended and added to the UAN solution. One of the compounds is a form of molybdate. Typically an aqueous solution of alkali metal molybdate would be utilized, such as Sodium or Potassium molybdate ($Na_2MoO_4$ or $K_2MoO_4$), however, any other form of molybdate that can deliver a molybdate ion can be used. The other additive or additives, referred to herein as secondary inhibitors, would be one or more of the inorganic phosphates (including phosphates, polyphosphates, and pyrophosphates) and organic phosphates or phosphonates. Inorganic phosphates include, but are not limited to, SHMP (Sodium Hexametaphosphate) and TKPP (Tetra-Potassium Pyrophosphate). There are numerous other inorganic phosphates that will also serve as suitable secondary inhibitors. Organic phosphates or phosphonates include, but are not limited to, HEDP (1-Hydroxyethylidine-1,1-diphosphonic acid; also known as ethanol diphosphonate, acetodiphosphonic acid, or etidronic acid), ATMP or AMP (aminotri (methylenephosphonic acid)), PBTC (Phosphonobutane tricarboxylic acid), DETPMP (Diethylenetriaminepenta (methylene phosphonic acid)), and HPA (hydroxyphosphono acetic acid). There are numerous other organic phosphates and phosphonates that will also serve as suitable secondary inhibitors.

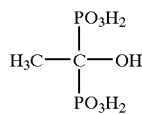

Formula: $C_2H_8O_7P_2$
Molecular Weight: 206

HEDP

The combination of molybdate with one or more of the phosphates has surprisingly resulted in lower corrosion rates than either compound used alone, even at comparable dosage rates, and has resulted in cleaner UAN solutions with little iron or other material precipitates than with either inhibitor used alone. Precipitates are undesirable, both from a product quality standpoint, but also because precipitates can cause localized corrosion, by creating a site which the inhibitor cannot reach, sometimes referred to as under-deposit corrosion. The avoidance of precipitates by the use of phosphorous containing compounds prevents the occurrence of under-deposit corrosion. The molybdate/phosphate combination also reduces or eliminates the pitting of ferrous metals, often seen in UAN solution exposed metals protected by the use of filmer-type corrosion inhibitors. The limited corrosion experienced with the molybdate/phosphate inhibitor appears to be evenly distributed over the surface of the exposed metal.

The dosage of molybdate and phosphate inhibitors can vary within a wide range, limited on the low side by the amount needed to insure adequate corrosion inhibition (taking into account that UAN solution may be further diluted by the agricultural user prior to use), and on the high side by the cost of the inhibitors and by the solubility of the inhibitors in the UAN solution. Amounts of molybdate (as $MoO_4$) can range from 1 ppm to 500 ppm by weight of UAN solution, with the preferred range from 10 ppm to 200 ppm. Amounts of phosphate can also range from levels as low as 1 ppm up to 500 ppm, with the preferred range being from 5 ppm to 50 ppm.

The inhibitor combination may be added to the UAN solution in a variety of ways. The inhibitors typically would be combined, and then added. However, that may also be added to the UAN independently. In addition, the inhibitors may be added during the production process of the UAN solution, or after production is complete. However, later addition of the inhibitors to the UAN solution obviously limits the protection afforded to the process equipment.

EXAMPLES

Tests were run on carbon steel coupons using a variety of phosphate compounds combined with molybdate. Table 1 summarizes the results of the first of these tests. An uninhibited 65 weight % aqueous solution of UAN was utilized (32% elemental Nitrogen). UAN solution was added to a 1 liter volumetric flask, and the volumes of required inhibitor compounds required to equal the proper dosage, as set forth in Table 1, were calculated. Each of the individual specific gravities of each solution was determined at 60 degrees F. using a 10 ml precision picometer. The individual test solutions were prepared by withdrawing aliquots of each corrosion inhibitor using a one CC precision syringe and injecting the resulting volume into the one liter volumetric flask containing the UAN solution. A water bath maintained at 89 degrees F. was utilized. Beakers containing the test solutions and metal test coupons were placed into the water bath. The ppm dosages of each inhibitor is expressed in relation to the weight of the UAN solution, including water.

Mild carbon steel coupons (alloy C1010) were prepared for use. Each coupon was weighed on an analytical balance, then immersed in a 10% HCL solution for one minute, to "activate" the coupons, rinsed with 95% reagent grade ethanol to a pH of 7.0. The coupons were then suspended in the test solution using a nylon filament.

Coupons were left in the UAN solutions either 4 days, or 13 days, as shown in Table 1. Upon removal from the UAN solutions, the coupons were gently cleaned using a brush and soap, rinsed with deionized water, dried and weighed. The mils per year loss rate was then calculated based upon the weight loss in the coupon. The UAN solution was monitored during the course of the tests for any foaming, color change, and sludge/precipitate formation.

Table 1 includes the test results for the following:
Blank (no inhibitor in a UAN solution)
25 ppm MoO4, with no phosphate inhibitor
25 ppm MoO4, with 10 ppm of SHMP (Sodium Hexametaphosphate)
25 ppm MoO4, with 10 ppm of TKPP (Tetra-Patassuim Pyrophasphate)
25 ppm MoO4, with 10 ppm of HEDP (Hydroxyethylidinediphosphonic acid).

The results are expressed as mils per year (mpy), measured both after 4days and 13 days exposure to UAN, and as a percentage of improvement over the blank results.

TABLE I

|  | 4 Day % Inh. | 13 Day % Inh. | 4 Day mpy | 13 Day mpy |
|---|---|---|---|---|
| 25 ppm MoO$_4$ | 58% | 28% | 32 | 55 |
| 25 ppm MoO$_4$ 10 ppm SHMP | 72% | 45% | 21 | 42 |
| 25 ppm MoO$_4$ 10 ppm TKPP | 75% | 46% | 19 | 41 |
| 25 ppm MoO$_4$ 10 ppm HEDP | 68% | 53% | 24 | 36 |
| 25 ppm MoO$_4$ 30 ppm HEDP | 64% | 62% | 27 | 29 |
| Blank | — | — | 76 | 76 |

Additional tests were run on carbon steel coupons using a HEDP as the phosphate inhibitor combined with molybdate. Two tests were run using HEDP alone. The same procedures as those outlined above were utilized. Table 2 summarizes the results of these tests. Table 2 includes the test results for the following:
Blank (no inhibitor in a UAN solution)
25 ppm MoO4, with no secondary inhibitor
10 ppm of HEDP with no MoO4
30 ppm of HEDP with no MoO4
25 ppm MoO4, with 10 ppm of HEDP
25 ppm MoO4, with 30 ppm of HEDP
15 ppm MoO4, with 30 ppm of HEDP
15 ppm MoO4, with 10 ppm of HEDP Again, the results are expressed as mils per year (mpy), measured both after 4 days and 13 days exposure to UAN, and as a percentage of improvement over the blank results.

TABLE 2

|  | 4 Day % Inh. | 13 Day % Inh. | 4 Day mpy | 13 Day mpy |
|---|---|---|---|---|
| 25 ppm MoO$_4$ | 37% | 17% | 36 | 65 |
| 10 ppm HEDP | 4% | 5% | 55 | 74 |
| 30 ppm HEDP | 16% | 35% | 48 | 51 |
| 25 ppm MoO$_4$ 10 ppm HEDP | 74% | 71% | 15 | 23 |
| 25 ppm MoO$_4$ 30 ppm HEDP | 77% | 82% | 13 | 14 |
| 15 ppm MoO$_4$ 30 ppm HEDP | 68% | 73% | 18 | 21 |
| 15 ppm MoO$_4$ 10 ppm HEDP | 54% | 32% | 26 | 53 |
| Blank | — | — | 57 | 78 |

As evidenced from the attached tables, the combination of molybdate and HEDP, SHMP or TKPP showed much better corrosion inhibition results than molybdate alone, or the secondary inhibitor HEDP alone.

Additional tests were run on carbon steel coupons using molybdate with combinations of phosphate inhibitors. A similar test method as that described above was utilized. Tests were run on carbon steel coupons (alloy C1018) using a variety of phosphate compounds combined with molybdate. Table 3 summarizes the results of these tests. The water bath was maintained at 90 degrees F. and coupons were exposed for 6 and 14 days. A 65 weight % uninhibited aqueous solution of UAN was prepared (32% elemental Nitrogen), having a specific gravity of approximately 1.343. 500 mls of UAN solution were added to each beaker and the volume of required inhibitor compounds required to equal the proper dosage, as set forth in Table 3, were calculated. The amount of each compound was added to the 500 mls of UAN solution using a syringe, and was mixed using a teflon stirring rod.

Mild carbon steel coupons (alloy C1018) were prepared for use. Each coupon was weighed on an analytical balance, carefully degreased using methanol, rinsed with demineralized water, and allowed to dry. The coupons were then immersed in a 10% HCL solution for one minute, to "activate" the coupons, rinsed with demineralized water, and then immersed in the appropriate beaker of UAN solution and inhibitor compound.

Coupons were left in the UAN solutions either 6 days, or 14 days, as shown in Table 3. Upon removal from the UAN solutions, the coupons were gently cleaned using a brush and soap, rinsed with demineralized water, dried and weighed. The mils per year loss rate was then calculated based upon the weight loss in the coupon. Table 3 summarizes the results of these tests and includes the following:

TABLE 3

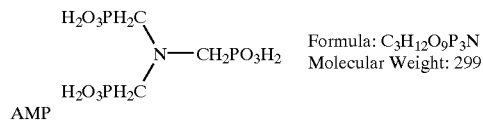

AMP — Formula: C$_3$H$_{12}$O$_9$P$_3$N, Molecular Weight: 299

Blanks
25 ppm MoO4, with 10 ppm of HEDP
25 ppm MoO4, with 10 ppm of a blend of 70% HEDP/30% AMP (Aminotri (methylenephosphic acid))
25 ppm MoO4, with 10 ppm of a blend of 35% HEDP/15% AMP/50% HPA (Hydroxyphosphone acetic acid)

| Sample Description | PPM Phosphate Dosage | PPM Mo Dosage | # Days Screened | Coupon Number | Coupon Initial Wt. | Coupon Final Wt. | Net Weight Loss | mpy Corrosion | % Inihibition |
|---|---|---|---|---|---|---|---|---|---|
| Blank | 0 | 0 | 6 | 2495 | 11.3233 | 10.8296 | 0.4937 | 88.6 | 0% |
| Blank | 0 | 0 | 14 | 2496 | 11.3415 | 10.3720 | 0.9695 | 74.6 | 16% |
| HEDP | 10 | 25 MoO$_4$ | 6 | 2506 | 11.3035 | 11.0509 | 0.2526 | 45.4 | 49% |
| HEDP | 10 | 25 MoO$_4$ | 14 | 2507 | 11.3582 | 10.5792 | 0.7790 | 59.9 | 32% |
| HEDP | 10 | 25 MoO$_4$ | 14 | 2508 | 11.3640 | 10.5350 | 0.8290 | 63.8 | 28% |
| 70/30 HEDP/AMP | 10 | 25 MoO$_4$ | 6 | 2509 | 11.0735 | 10.8888 | 0.1847 | 33.2 | 63% |
| 70/30 HEDP/AMP | 10 | 25 MoO$_4$ | 14 | 2510 | 11.3450 | 10.6076 | 0.7374 | 56.7 | 36% |

TABLE 3-continued

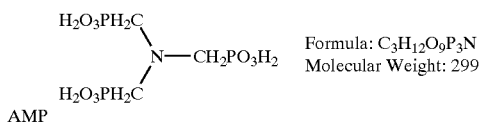
AMP

Formula: $C_3H_{12}O_9P_3N$
Molecular Weight: 299

Blanks
25 ppm MoO4, with 10 ppm of HEDP
25 ppm MoO4, with 10 ppm of a blend of 70% HEDP/30% AMP (Aminotri (methylenephosphic acid))
25 ppm MoO4, with 10 ppm of a blend of 35% HEDP/15% AMP/50% HPA (Hydroxyphosphone acetic acid)

| Sample Description | PPM Phosphate Dosage | PPM Mo Dosage | # Days Screened | Coupon Number | Coupon Initial Wt. | Coupon Final Wt. | Net Weight Loss | mpy Corrosion | % Inihibition |
|---|---|---|---|---|---|---|---|---|---|
| 70/30 HEDP/AMP | 10 | 25 MoO$_4$ | 14 | 2511 | 11.3850 | 10.6744 | 0.7106 | 54.7 | 38% |
| 35/15/50 HEDP/AMP/HPA | 10 | 25 MoO$_4$ | 6 | 2512 | 11.3845 | 11.2083 | 0.1762 | 31.6 | 64% |
| 35/15/50 HEDP/AMP/HPA | 10 | 25 MoO$_4$ | 14 | 2513 | 11.2863 | 10.5237 | 0.7626 | 58.7 | 34% |
| 35/15/50 HEDP/AMP/HPA | 10 | 25 MoO$_4$ | 14 | 2514 | 11.3805 | 10.5716 | 0.8089 | 62.2 | 30% |
| Acidified Coupon | | | | 2515 | 11.0607 | 11.0596 | 0.0011 | | |

The results are expressed as mils per year (mpy), measured both after 6 days and 14 days exposure to UAN, and as a percentage of improvement over the blank results. Table 3 reveals that the molybdate/phosphate inhibitor blends significantly inhibited the corrosion of the carbon steel coupons.

It is anticipated that the use of other pyrophosphates and hexaphosphates would yield similar results. Such compounds would include, but not be limited to, tetrasodiumpyrophosphate (TSPP), and sodiumtripolyphosphates (STPP).

The foregoing description of the invention is intended to disclose the best mode for practicing the invention. However, variations on this mode will be apparent to those skilled in the art and are intended to be within the scope of the claims set forth below.

We claim:

1. A corrosion inhibiting solution for use with Urea Ammonium Nitrate solutions consisting of: an aqueous solution of molybdate ion and at least one of phosphorous containing compounds selected from the group consisting of organic phosphates, organic phosphonates, and inorganic phosphates whereby said aqueous solution can be combined with Urea Ammonium Nitrate solutions to provide between 1 ppm and 500 ppm of said molybdate ion by weight of Urea Ammonium Nitrate solution, and between 1 pm and 500 ppm of said at least one of the phosphorous containing compounds by weight of the Urea Ammonium nitrate solution.

2. A corrosion inhibiting solution as in claim 1 wherein said inorganic phosphate is at least one of the compounds selected from the group consisting of Sodium Hexametaphospate and Tetra-Potassium Pyrophosphate.

3. A corrosion inhibiting solution as in claim 1 wherein said at least one of the phosphorous containing compounds is at least one of the compounds selected from the group consisting of HEDP (1-Hydroxyethylidine-1,1-diphosphonic acid; also known as ethanol diphosphonate, acetodiphasphonic acid, or etidronic acid), ATMP (aminotri (methylenephosphonic acid)), PBTC (Phosphonobutane tricarboxylic acid), DETPMP (Diethylenetriaminepenta (methylene phosphonic acid)), and HPA (hydroxyphosphono acetic acid).

4. A corrosion inhibiting solution as in claim 1 wherein said at least one of the phosphorous containing compounds is a mixture of inorganic and organic phosphates.

5. A corrosion inhibiting solution as in claim 1 wherein said molybdate ion is added to said aqueous solution in the form of an alkali metal molybdate.

6. A corrosion inhibiting solution as in claim 1 wherein said molybdate ion is added to said aqueous solution in the form of sodium molybdate.

7. A corrosion inhibiting solution for use with Urea Ammonium Nitrate solutions consisting of: an aqueous solution of molybdate ion and at least one of the phosphorus containing compounds selected from the group consisting of organic phosphates, organic phosphonates, and inorganic phosphates whereby said aqueous solution can be combined with Urea Ammonium Nitrate solutions to provide between 10 ppm and 200 ppm of said molybdate ion by weight of Urea Ammonium Nitrate solution, and between 5 ppm and 500 ppm of said at least one of the phosphorus containing compounds by weight of Urea Ammonium Nitrate solution.

8. A corrosion inhibiting solution as in claim 7 wherein said at least one of the phosphorous containing compounds is at least one of the compounds selected from the group consisting of Sodium Hexametaphosphate, Tetra-Potassium Pyrophosphate, HEDP (1-Hydroxyethylidine-1,1-diphosphonic acid; also known as ethanol diphosphonate, acetodiphasphonic acid, or etidronic acid), ATMP (aminotri (methylenephosphonic acid)), PBTC (Phosphonobutane tricarboxylic acid), DETPMP (Diethylenetriaminepenta (methylene phosphonic acid)), and HPA (hydroxyphosphono acetic acid).

9. A corrosion inhibiting solution as in claim 7 wherein said molybdate ion is added to said aqueous solution in the form of an alkali metal molybdate.

10. A corrosion inhibiting solution as in claim 7 wherein said molybdate ion is added to said aqueous solution in the form of sodium molybdate.

* * * * *